United States Patent [19]
van Daele

[11] Patent Number: 5,113,797
[45] Date of Patent: May 19, 1992

[54] ADJUSTABLE FEEDING DEVICE FOR POULTRY

[75] Inventor: Antoine A. van Daele, Eeklo, Belgium

[73] Assignee: Roxell, N.V., Maldegem, Belgium

[21] Appl. No.: 591,738

[22] Filed: Oct. 2, 1990

[30] Foreign Application Priority Data

Oct. 4, 1989 [NL] Netherlands ............... 8902461

[51] Int. Cl.⁵ .............................................. A01K 5/02
[52] U.S. Cl. ................................... 119/53; 119/57.4
[58] Field of Search ............... 119/53, 57.4, 52.4; 248/58, 61, 62, 63

[56] References Cited

U.S. PATENT DOCUMENTS

| | | | |
|---|---|---|---|
| 4,476,811 | 10/1984 | Swartzendruber | 119/57.4 |
| 4,527,513 | 7/1985 | Hart et al. | 119/57.4 X |
| 4,552,095 | 11/1985 | Segalla | 119/53 |
| 5,007,380 | 4/1991 | Badia et al. | 119/53 |

FOREIGN PATENT DOCUMENTS 0105571 4/1984 European Pat. Off. ........... 119/57.4

Primary Examiner—Gene Mancene
Assistant Examiner—Thomas Price
Attorney, Agent, or Firm—Hurt, Richardson, Garner, Todd & Cadenhead

[57] ABSTRACT

A poultry feeding device comprises an essentially dish-shaped pan, the bottom of which is provided with an upright part. A drop tube for the supply of feed can be moved over a limited, variable distance relative to the bottom of the pan to form a first feed supply opening of variable size. The drop tube has one or more second feed supply openings. In the bottom position of the drop tube the first feed supply opening is closed and the second feed supply opening(s) are opened, and in the top position of the drop tube this is reversed. The upright part of the bottom of the pan extends in the drop tube, and in the bottom position of the drop tube the top side of the upright part reaches to the second feed supply opening(s) and at that point shuts off the drop tube.

8 Claims, 3 Drawing Sheets

ADJUSTABLE FEEDING DEVICE FOR POULTRY

BACKGROUND OF THE INVENTION

This invention relates to a feeding device, in particular for poultry, comprising:

an essentially dish-shaped pan with a bottom and an upright peripheral wall in which feed can be presented to the birds, and the bottom of which is provided with a central upright part, a drop tube for the supply of feed to the pan, the lower free end of which is situated centrally above the bottom of the pan, which drop tube can be moved over a limited, variable distance relative to the bottom of the pan in order to form a first feed supply opening of variable size between the bottom free end of the drop tube and the bottom of the pan, as a result of which feed can pass from the drop tube into the pan, and which drop tube at a distance from the free end is provided with one or more second feed supply openings, in the bottom position of the drop tube the first feed supply opening being closed and the second feed supply opening(s) being opened, and in the top position of the drop tube the first feed supply opening being open and the second feed supply opening(s) being closed.

DISCUSSION OF THE PRIOR ART

Such a feeding device is described in European Patent Specification 0 105 571 and is intended for feeding poultry in free-range poultry breeding farms.

A complete feeding system, in which usually many feeding devices are incorporated, generally further comprises a storage device for a large volume of feed and a conveyor by means of which feed can be transferred from the storage device to the feeding devices in a controlled manner.

The known feeding device is suitable for feeding not only very young birds, including one-day-old chicks, but also more or less fully-grown birds through the presence of first and second feed supply openings.

For one-day-old chicks the feed must be presented readily accessible and visible. This condition is met by resting the dish-shaped pan of the known feeding device on the ground and resting the free end of the drop tube on the dish-shaped pan, so that the first feed supply opening is closed and the second feed supply openings are opened. When a feeding device is empty, feed supplied by the conveyor will first fill the drop tube up to the second feed supply openings, following which the feed will fill the dish-shaped element outside the drop tube through the second feed supply openings. The one-day-old chicks can easily see this feed, while the design of the feeding device is such that the birds can jump into it and walk on top of the feed to be able to eat it.

For older, larger birds the known feeding device can be raised on the drop tube until the dish-shaped pan gets away from the ground, as a result of which the second feed supply openings are closed and the first feed supply opening is opened. The cross-section of the first feed supply opening is variable and adjustable and determines the level of the feed in the dish-shaped pan, while in addition the texture of the feed, for example in meal or granular form, plays a role. Bars prevent fully or partially grown birds from being able to walk around in a feeding device, but the bars are spaced far enough apart to give access for the head and neck of the birds, so that the feed is easy to reach.

A disadvantage of the feeding device according to the state of the art is that in the bottom part of the drop tube when it is resting on the dish-shaped pan in the feeding position for very young birds there is a substantial empty space which fills up with feed on the first filling of the feeding device, following which the feed in it is not used for a long time. The feed is not released again from the bottom of the drop tube until another feeding position is set by moving the drop tube upwards relative to the dish-shaped pan. It is then quite stale, so that the quality and attractiveness are reduced, which does not benefit the appetite and growth of the birds.

When the first feed supply opening is open, another disadvantage of the relatively large empty space is the low feed flow rate, and thus the long residence time at a particular volume of feed consumed per unit time, as a result of which the quality of the feed near the feed supply opening is adversely affected. This effect is further reinforced by the shape of the dish-shaped pan, in which, at a particular height of the drop tube above the pan, feed lies spread over a relatively large area, as a result of which again there is a long residence time of the feed in the device.

A further disadvantage of the above-mentioned empty space in the bottom part of the drop tube is the risk of a chick, in particular a one-day-old chick, crawling into the drop tube through a second feed supply opening in order to eat, and being buried by freshly supplied feed. In particular, if the feed level in the empty space is reduced because some of the feed has been eaten there, there is a great risk of the chick having no chance again of leaving the drop tube, and suffocating.

In practice it has also been found that during use of the feeding device, when the birds are constantly turning up the feed with their beaks—and the very young birds also with their feet—, when there is an adequate supply the level of the feed drops slightly in the radial direction and extends from the top side of a feed supply opening (either the first feed supply opening, or the second feed supply opening) to the inside of the dish-shaped pan at a slightly lower level. This means that in the position for feeding the very young birds the known feeding device readily overflows, which means that the feed in this position could flow over the upright peripheral edge of the dish-shaped pan, or at least is at such a high level therein that the chicks can easily spill the feed out of the feeding device, because both the top side and the bottom side of each second feed supply opening are lying above the top side of the upright peripheral wall of the dish-shaped pan.

SUMMARY OF THE INVENTION

The object of the invention is to eliminate the above-mentioned disadvantages.

This object is attained according to the invention with a feeding device, wherein the central upright part of the bottom of the pan extends in the bottom part of the drop tube and is formed in such a way that in the bottom position of the drop tube the top side of the central upright part reaches to the bottom edge of the second feed supply opening(s) and at that point shuts off the drop tube to the bottom thereof.

The feeding device according to the invention has no empty space in the bottom part of the drop tube in which feed can remain unused for a long time. This means that feed once presented in a feeding device is always eaten within a specific period of time, so that the quality and the attractiveness of the feed can remain high.

The dimensions of the second feed supply opening(s) can be chosen relatively small, if the top side of the central upright part of the bottom of the pan, which part forms the closure of the empty space in the drop tube, is made conical, since this facilitates the outflow of the feed. This cone also forms a reduction of the dimensions of the second feed supply opening in the vertical direction, so that very young birds, in particular one-day-old chicks, are definitely prevented from crawling through this opening into the drop tube.

Spilling and thus wastage of feed by very young birds is prevented through the fact that the top edge of the second feed supply opening(s) lies only slightly higher (and the bottom edge thereof lies lower) than the top edge of the upright peripheral wall of the dish-shaped pan.

If the part of the drop tube situated below the second feed supply opening(s) is made conical, less feed will be present in the dish-shaped pan than if this were not the case, which advantageously necessitates quicker replenishment of the feed, which is consequently more attractive, and thus promotes the growth of the poultry.

A rapid replenishment of the feed is also achieved through the shape of the bottom of the pan and the bottom side of the central upright part thereof in the feeding device according to the invention. The deepened channel of the bottom namely ensures that at a specific height of the feed in the pan the exposed feed surface is relatively small, so that the flow rate of the feed is high and the residence time of the feed in the device is short. The same effects are achieved by directing the bottom side of the central upright part of the bottom of the pan towards the bottom edge of the bottom part of the drop tube.

The claims and advantages will be more readily appreciated as the same becomes better understood by reference to the following detailed description and considered in connection with the accompanying drawings in which like reference symbols designate like parts in the figures.

DESCRIPTION OF THE PREFERRED EMBODIMENT

Figure 1:
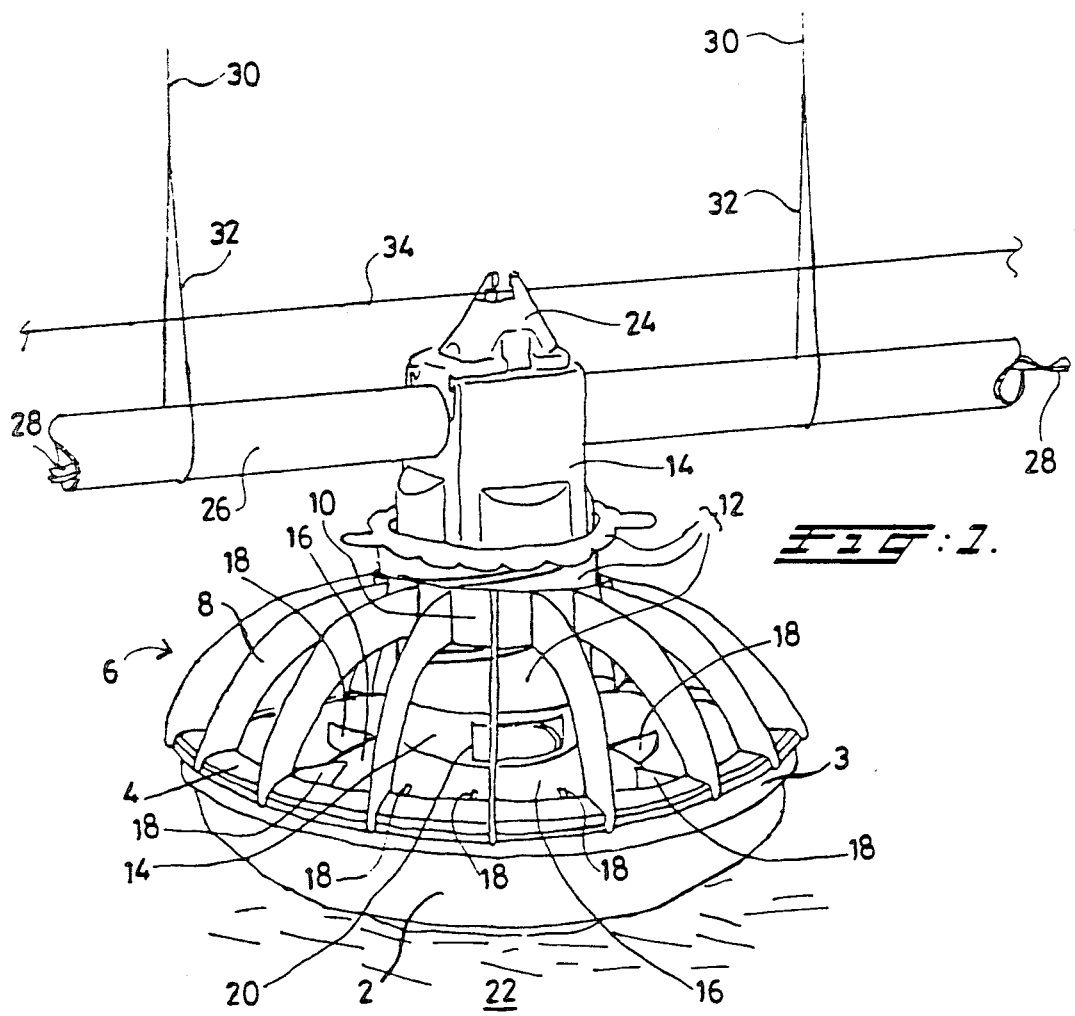
FIG. 1 shows a perspective view of a feeding device according to the invention.

FIG. 1 shows a round, essentially dish-shaped pan 2, on the upright peripheral wall 3 of which a snap ring 4 of a grille 6 is fixed by means of a snap connection. The grille 6 comprises a number of flat, curved bars 8 which extend radially upwards from the snap ring 4, and the ends of which are connected to a ring 10. The ring 10 is provided on the inside with screw thread in which an externally threaded collar 12 can turn, in which way collar 12 can be adjusted in height relative to the pan 2.

The feeding device also comprises a drop tube 14 which can slide in the collar 12 and at the bottom side comprises a conical part 16 which is provided with radially extending faces 18. Two feed supply openings 20 are also fitted in the drop tube.

The top side of the drop tube 14 together with a locking part 24 encloses a tube 26, which forms part of a feed conveyor, in which tube 26 feed is moved along by means of a rotating, flat helical member 28. At the level of the drop tube 14, the tube 26 is provided at the bottom side with an opening (not shown) through which feed can fall into the drop tube 14. The tube 26 is suspended from wires 30 which end in a loop 32 around the tube 26. Stretched above and parallel to the tube 26 is also a wire which runs through two hook-shaped projections of the locking part 24 and ensures that birds cannot sit on the tube 26.

The wires 30 can also be used for raising or lowering the tube 26 by means of a hoisting device (not shown). Since the drop tube 14 is fixed to the tube 26 by means of the locking part 24, when the tube 26 is lowered, if the pan 2 is resting on the ground 22, the drop tube will slide through the collar 12 until the conical part 16 thereof is resting on the top side of the pan 2. This position is shown in FIG. 1, and the second feed supply openings 20 are open here. When in this position sufficient feed is fed in through the tube 26 to the drop tube 14, the pan is filled through the second feed supply openings 20, so that very young birds in particular, for example one-day-old chicks, can be fed with the feeding device. They can jump from the ground 22 through the mesh of the grille 6 into the pan 2 in order to reach the feed.

When the tube 26 is raised from the position shown in FIG. 1 by means of the wires 30, the drop tube 14 slides in the first instance upwards in the collar 12. The second feed supply openings 20 are thereby shut off by the bottom side of the collar 12. After the bottom edge of the collar has come into contact with the top part of the conical part 16 of the drop tube when the drop tube 14 is raised, the whole feeding device is then raised from the ground 22. The lifting movement is stopped when the feeding device is suspended at a desired height above the ground, which height is determined by the size of the partially or fully grown birds which have to be fed in this way. The mesh in the grille 6 between the bars 8 is large enough to allow through the head and neck of the birds. In the last-mentioned position the feed supplied by the conveyor leaves the drop tube 14 through a first feed supply opening which is formed by the pan 2 and the bottom edge of the conical part 16 of the drop tube 14.

The above will be explained further with reference to FIGS. 2 and 3.

Figure 2:
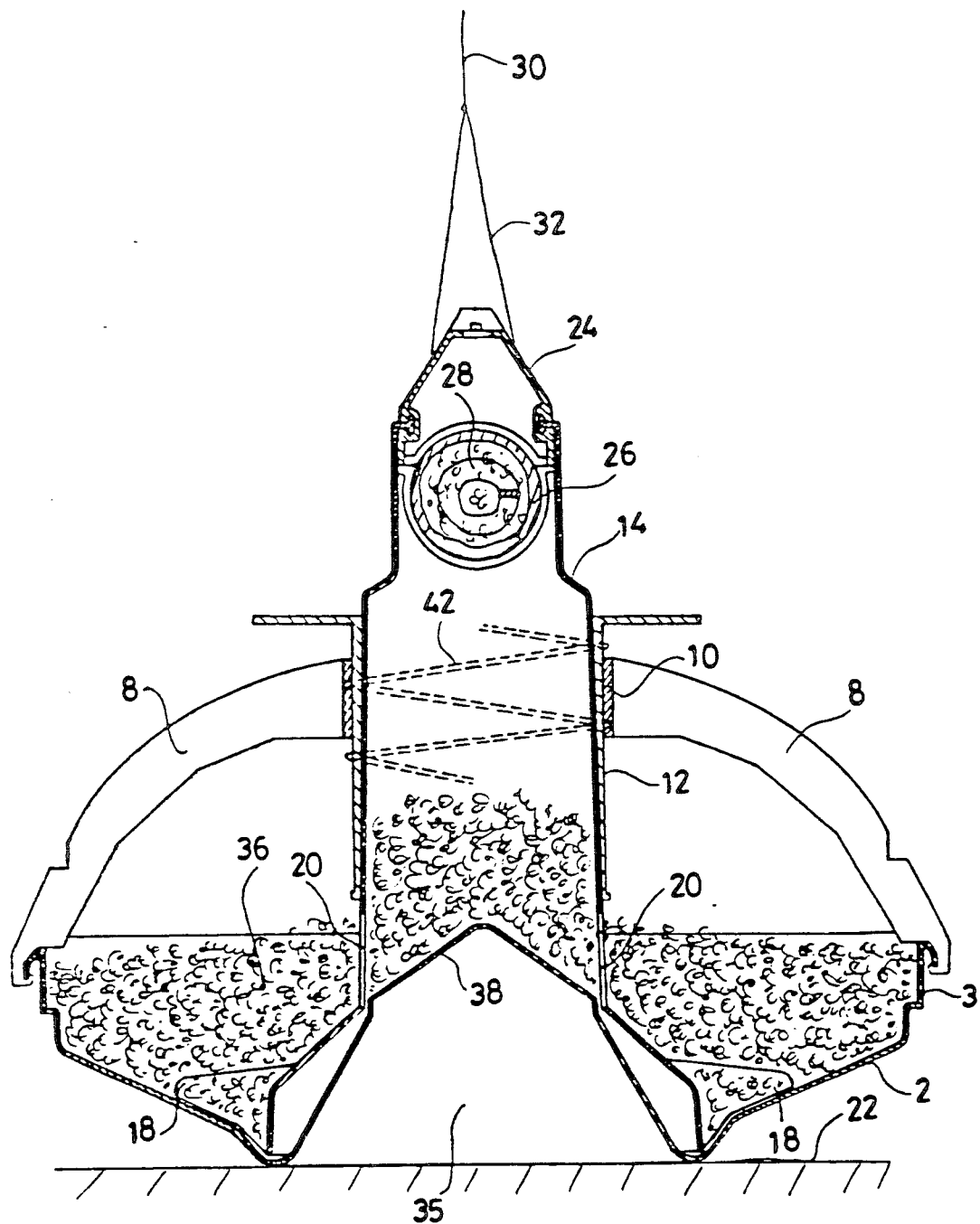
FIG. 2 shows a cross-section of the feeding device of FIG. 1, filled with feed and in the feeding position for very young birds.

FIG. 2 shows the position of the feeding device for feeding very young birds, which are allowed to move around freely in the feeding device. The free end of the drop tube 14 is resting on the bottom of the pan 2, which bottom in turn rests on the ground 22. In this position a central upright part 35 of the bottom of the pan extends into the drop tube 14 and shuts off this tube from the bottom edge of the second feed supply openings 20, so that no feed can fall into the lower part of the drop tube 14. The feed 36 flows from the drop tube 14 out of the second feed supply openings 20, and this is facilitated by the conical shape 38 of the top side of the central upright part 35.

Figure 3:
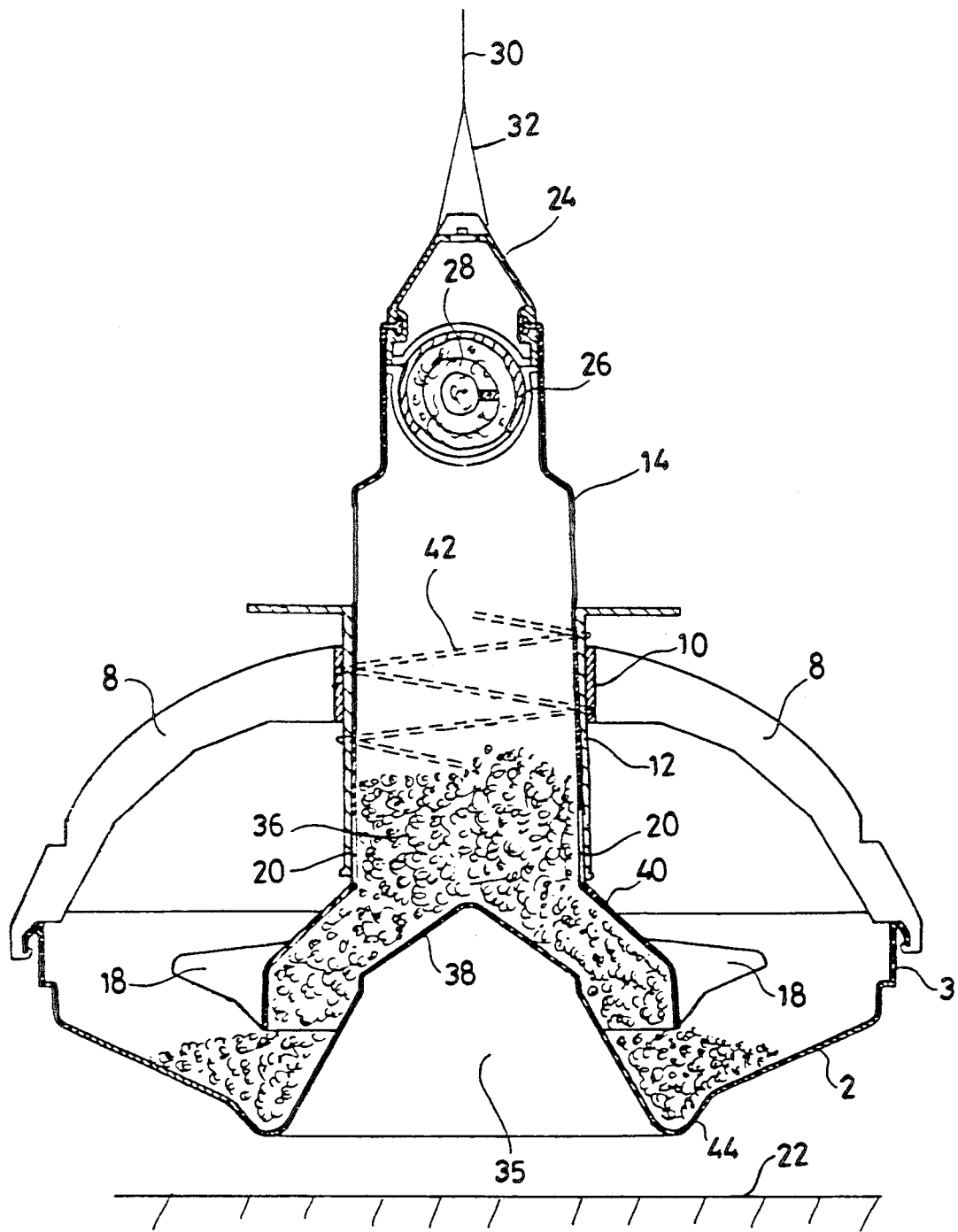
FIG. 3 shows a cross-section of the feeding device of FIG. 1, filled with feed and in a feeding position for partially or fully grown birds.

FIG. 3 shows the position of the feeding device for feeding older birds, which are allowed only to put their heads and necks into the feeding device. The feeding device is suspended above the ground 22, so that the top edge of the conical part 40 of the drop tube 14 rests against the bottom edge of the collar 12, and the second feed supply openings 20 are shut off. In this position of the feeding device the feed flows through the opening 10 which is formed by the central upright part 35 and the conical part 40, to the bottom of the pan 2. This opening can be made larger or smaller by turning the collar 12 in the ring 10. For fixing a particular position, the screw thread connection 42 between the collar 12 and the ring 10 is provided with fixing means, which are not shown in any further detail. The bottom of the pan 2 is provided with a deepened channel 44.

Figure 4:
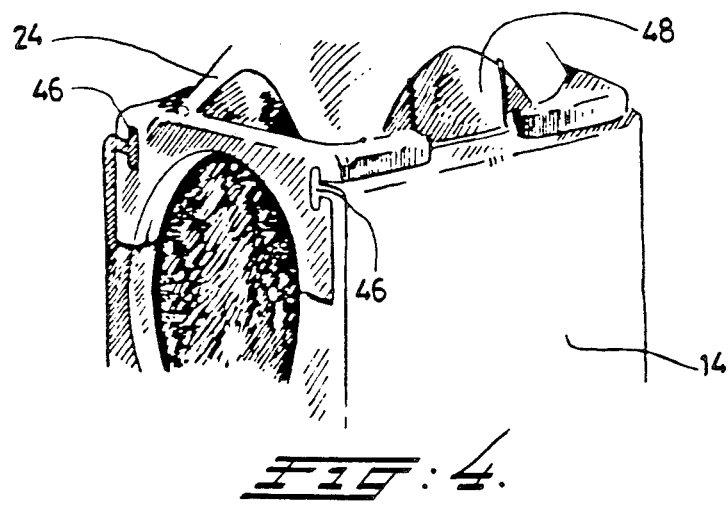
FIG. 4 shows a view in perspective of the top part of the drop tube of the feeding device according to the invention.

The fixing of the feeding device around the tube 26 of the feed conveyor is described with reference to FIG. 4. The drop tube 14 has on either side of the tube 26 projections 46 facing each other and having a T-shaped profile which for the fixing of the feeding device can engage in corresponding apertures with a T-shaped profile of the locking part 24, which locking part for this purpose must be slid in the lengthwise direction of and over the tube 26. When the position shown in the drawing is reached, two flexible lips 48 fitted on either side of the locking part 24 snap into recesses (not shown in further detail) of the drop tube 14 and this snap connection prevents further shifting of the locking part 24 over the tube 26 relative to the drop tube 14. In this way a very strong connection between the drop tube 14 and the locking part 24 is formed, but this connection is easy to undo by hand by pressing the lips 48 towards each other and then sliding the locking part 24 away from the drop tube 14 over the tube 26, following which the feeding device can be removed, for example for cleaning.

What is claimed is:

1. A feeding device, in particular for poultry, comprising:
   a generally dish-shaped pan having a bottom and an upright peripheral wall in which feed can be presented to the birds, said bottom being provided with a central upright part,
   a drop tube for supplying feed to said pan, a lower free end of said drop tube being situated centrally above said bottom of said pan, said drop tube being adapted to be moved over a limited, variable distance relative to said bottom of said pan between a lowered position and a raised position, and with said drop tube in said raised position defining a first feed supply opening between said lower free end of said drop tube and said bottom of said pan, as a result of which feed can pass from said drop tube into said pan, and wherein said drop tube comprises at least one second feed supply opening positioned a distance from said lower free end of said drop tube, wherein with said drop tube in said lowered position said first feed supply opening is closed and said second feed supply opening is open, and with said drop tube in said raised position said first feed supply opening is open and said second feed supply opening is closed, and
   wherein said central upright part extends in a bottom part of said drop tube and is configured such that with said drop tube in said lowered position a top side portion of said central upright part reaches to adjacent a bottom edge of said second feed supply opening.

2. A feeding device according to claim 1, wherein said top side of said central upright part of said bottom of said pan is conical.

3. A feeding device according to claim 1, wherein said top side of said central upright part of said bottom of said pan together with a top edge of said second feed supply opening define a passage which prevents a one-day-old chick from passing therethrough.

4. A feeding device according to claim 1, wherein with said drop tube in said lowered position said bottom edge of said second feed supply opening lies below, and a top edge said second feed supply opening lies above, a top edge of said upright peripheral wall of said pan.

5. A feeding device according to claim 1, wherein said bottom part of said drop tube is generally conical-shaped.

6. A feeding device according to claim 1, wherein an outside peripheral wall of said central upright part of said bottom of said pan is directed generally parallel to an inside peripheral wall of said bottom part of said drop tube.

7. A feeding device according to claim 1, wherein said bottom of said pan defines a transition region between said upright peripheral wall and said central upright part, and wherein a deepened channel is formed in said transition region, on a bottom of which deepened channel said bottom edge of said drop tube rests when said drop tube is in said lowered position.

8. A feeding device according to claim 1, wherein a top part of said drop tube is removably connected by projection means to a locking part for fixing the feeding device around a part of a feed conveyor, said projection means having a T-shaped profile which are slidable at right angles to a lengthwise direction of said drop tube into corresponding apertures with a T-shaped profile.

* * * * *